United States Patent [19]
Sunderland et al.

[11] Patent Number: 5,337,215
[45] Date of Patent: Aug. 9, 1994

[54] PIVOTING BATTERY COMPARTMENT AND DOOR

[75] Inventors: Richard A. Sunderland, St. Charles, Mo.; John A. Lane, Watertown, N.Y.

[73] Assignee: Sherwood Medical Company, St. Louis, Mo.

[21] Appl. No.: 145,719

[22] Filed: Oct. 29, 1993

Related U.S. Application Data

[63] Continuation of Ser. No. 911,830, Jul. 10, 1992, abandoned.

[51] Int. Cl.$^5$ .................. H05K 7/16; H01M 2/10; H02B 1/044
[52] U.S. Cl. .................. 361/726; 429/97; 200/43.22; 361/610
[58] Field of Search ................. 429/96–100; 200/43.01, 43.11, 43.22, 333; 361/610, 622, 642, 643, 724–727

[56] References Cited

U.S. PATENT DOCUMENTS

| | | | |
|---|---|---|---|
| 2,154,653 | 4/1939 | Anketell | 429/97 |
| 2,975,226 | 3/1961 | Lehr | 429/97 |
| 3,138,491 | 6/1964 | Rubio | 429/97 |
| 3,943,537 | 3/1976 | Lange | 429/98 X |
| 4,191,917 | 3/1980 | Brown et al. | 429/97 X |
| 4,206,274 | 6/1980 | Peels | 429/99 |
| 4,269,908 | 5/1981 | Stemme | 429/98 |
| 4,391,883 | 7/1983 | Williamson et al. | 429/97 |
| 4,578,628 | 3/1986 | Siwiak | 429/97 X |
| 5,001,772 | 3/1991 | Holcomb et al. | 429/99 X |
| 5,107,401 | 4/1992 | Youn | 429/100 X |

FOREIGN PATENT DOCUMENTS 480194 2/1938 United Kingdom.

Primary Examiner—Leo P. Picard
Assistant Examiner—Michael W. Phillips
Attorney, Agent, or Firm—Montgomery W. Smith; Curtis D. Kinghorn; David A. Warmbold

[57] ABSTRACT

A battery compartment for a device having a housing is provided. The battery compartment pivots around an axis that is generally parallel with a wall of housing. The battery compartment is generally an elongated wedge or sector shape with an elongated pivoting axis extending along the apex of the wedge. One planar side of the wedge becomes a portion of the wall of the housing as the battery compartment is pivoted about the elongated axis into a closed position. This planar side becomes a door into the housing that is opened or closed as the battery compartment is pivoted around its pivoting axis. As the battery compartment is pivoted around its pivoting axis, the battery compartment rotates out and away from the plane that previously encompassed the wall of the device so that access to the batteries may be had. The battery compartment encloses the batteries and segregates them from the other components in the housing. Furthermore, the battery compartment of the instant invention prevents foreign objects from being introduced into the interior of the housing when the door of the battery compartment is in either of its open or closed positions, or being moved therebetween. In one embodiment of the instant invention, switches, such as DIP switches, are attached to the battery compartment so that as the battery compartment is rotated around its pivoting axis, access may be had to the switches.

21 Claims, 5 Drawing Sheets

PIVOTING BATTERY COMPARTMENT AND DOOR

This is a continuation of copending application(s) Ser. No. 07/911,830 filed on Jul. 10, 1992, now abandoned.

BACKGROUND OF THE INVENTION

1. Field of the Invention

The instant invention relates to a compartment for holding batteries and more specifically to a compartment that stores replaceable or rechargeable batteries and also serves as a door to the battery compartment.

2. Description of Related Art

With the development of rechargeable or disposable batteries and microelectronics, small disposable or rechargeable batteries have been used to power electronic instruments and devices. The combination of these disposable or rechargeable batteries and the small lightweight electronics renders the electronic devices or instruments relatively mobile.

Typically, the batteries are enclosed or encased in a housing which also contains the electronic components for the device. A typical battery compartment and door is shown in FIG. 1. In FIG. 1, the batteries 1 are typically of the elongated cylindrical type such as AA, AAA, C or D cells and are often placed lengthwise across the battery compartment 2 as shown. The battery compartment door 3 fits over, encases and encloses the batteries within the compartment.

Battery doors such as battery door 3 typically have sides 4 which contact side supports 5 around battery compartment 2 so that as battery door 3 is moved in the direction indicated by the arrow, battery sides 4 contact side supports 5 to position battery door 3. As battery door 3 is moved further over battery compartment 2, a fastening latch 6a contacts a slot 6 to lock battery door 3 in position over compartment 2. The edge of battery door 3 furthest from slot 6 often has a ridge 8 which contacts a corresponding groove 9 in the edge of battery compartment 2 for encasing the ridge 8 to prevent movement of battery door 3 away from battery compartment 2.

The prior art battery compartment and door shown in FIG. 1 and described above is not intended to encompass all battery compartments and doors, but is instead merely intended to illustrate a typical battery compartment and door. Innumerable changes and variations to the description described above and shown in FIG. 1 exist and are clearly understood and well known to those skilled in the art.

A common problem with battery compartments and doors such as that described above is that it is often relatively difficult to align the sides 4 of battery door 3 with the side supports 5 to position the battery door 3 to cover and encase the battery compartment 2.

An additional problem is that the battery compartment 2 is often not isolated from the interior of the housing 7 which encloses not only the battery compartment 2 but the electronics of the device. Consequently, when the batteries 1 leak within battery compartment 2, the leaking battery acid moves into and contacts the electronic components within housing 7 thereby damaging the electronic components.

Another problem with prior art battery compartments is that it is relatively difficult to remove the batteries 1 from the battery compartment 2. Because the batteries 1 are typically pushed into and enclosed by the battery compartment 2, finger access is restricted so that it is difficult to pry the batteries 1 out of the battery compartment 2. Often a cloth or similar strap is attached to the battery compartment 2 below the battery so that by raising an exposed end of the strap, the strap moves the batteries out of the battery compartment 2. However, placing and positioning the strap is difficult and removing the batteries with the strap is an awkward operation.

A further problem with prior art battery compartments and doors is that when the housing 7 is shocked as by dropping or a similar occurrence, stress very often causes the battery door 3 to jar loose from its connections and to fall away from the housing 7. When this happens the battery door 3 may either be lost or damaged. In addition, with the battery door 3 no longer in position, the shock may be sufficient to cause the batteries 1 to fall out of the battery compartment 2.

Another problem with the prior art battery compartments and doors is that the springs that are used to securely position the batteries against the electrical contacts within the battery compartment 2 must typically be greatly compressed in order to place the batteries within the compartment. After the batteries are placed in the battery compartment, the compressed spring relaxes somewhat and biases the opposite end of the battery to contact an electrical contact point. This stressing of the spring from no compression to highly compressed to mildly compressed during the process of loading batteries into the battery compartment may lead to spring fatigue which may eventually manifest itself in a weak contact between the battery and the electrical contact.

Very often in electronic devices, switches or similar means often need to be set to control the operation of the device. Very often it is intended that these switches should be set once and then not ordinarily reset during the operation of the device. Consequently, when this is the intended use of the switches, it is desirable to house the switches so that accidental or unintended resetting or movement of the switches may not occur. However, when it is appropriate to reset the switches, it is desirable to provide an easy access to the switches. But, restricting access to the switches also often makes it difficult to have access to the switches when desired.

Further, it is often desirable to ensure that power from the batteries is not enabled to the device when the switches are being set. Currently, it is difficult to easily ensure that the battery power is disconnected when the switches are being reset. It is desirable to provide a device that ensures that power is not supplied to the device while the switches controlling operations of the device are set.

SUMMARY OF THE INVENTION

In response to the problems and desirable features described above, a battery compartment for a device having a housing is provided. The battery compartment pivots around an axis that is generally parallel with a wall of housing. The battery compartment is generally an elongated wedge or sector shape with an elongated pivoting axis extending along the apex of the wedge or sector. One planar side of the wedge or sector becomes a portion of the wall of the housing as the battery compartment is pivoted about the elongated axis into a closed position. This planar side becomes a door into the housing that is opened or closed as the battery compartment is pivoted around its pivoting axis. As the battery compartment is pivoted around its pivoting axis, the battery compartment rotates out and away from the plane that previously encompassed the wall of the device so that access to the batteries may be had. The battery compartment encloses the batteries and segregates them from the other components in the housing. A sector shaped battery compartment denotes a compartment having a geometrical shape generally bounded by two radii and the included arc of a circle.

In one embodiment of the instant invention, switches, such as DIP switches, are attached to the battery compartment so that as the battery compartment is rotated around its pivoting axis, access may be had to the switches.

It is therefore an object of the instant invention to provide a battery compartment that encloses the batteries.

It is another object of the instant invention to provide a battery compartment that also has its own integral access door.

It is yet another object of the instant invention to provide a battery compartment that also acts as a door to the inside of the housing.

It is another object of the instant invention to provide a battery compartment and door assembly which provides easy access to the batteries. It is another object of the instant invention to provide a battery compartment and door assembly for a device which prevents foreign objects from being introduced into the interior of the device when the door assembly is in either of its open or closed positions, or being moved therebetween.

It is another object of the instant invention to provide a battery access and door which allows easy withdrawal of the batteries from the battery compartment.

It is another object of the instant invention to provide a battery compartment and door which also provides access to electronic switches placed within the housing during operation of the corresponding device.

It is another object of the instant invention to provide a battery compartment and door assembly which may be locked into a closed position.

It is another object of the instant invention to provide a battery access and door combination that makes it virtually impossible to lose the battery cover.

It is another object of the instant invention to provide a battery compartment and door assembly that is strong and able to survive a large physical shock, as for example from a fall onto a hard surface, without ejecting the batteries or the battery compartment door.

It is another object of the instant invention to provide a battery compartment and door assembly which ensures that power is shut off to the electronic device when access is had to the switches.

These and other objects of the instant invention will be clear from the description contained herein and more particularly with reference to the following detailed description and the drawings where like elements are referred to by like reference numbers.

DETAILED DESCRIPTION OF THE INVENTION

Figure 1:
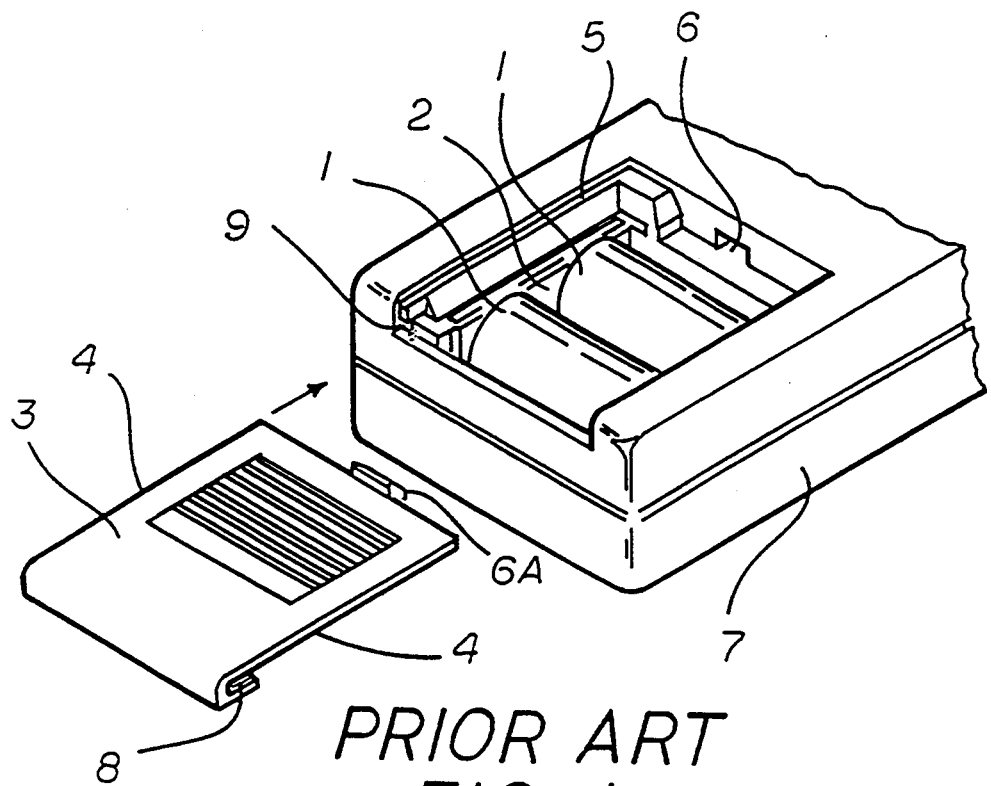
FIG. 1 is an exploded perspective view of a prior art battery compartment and door assembly.
Figure 2:
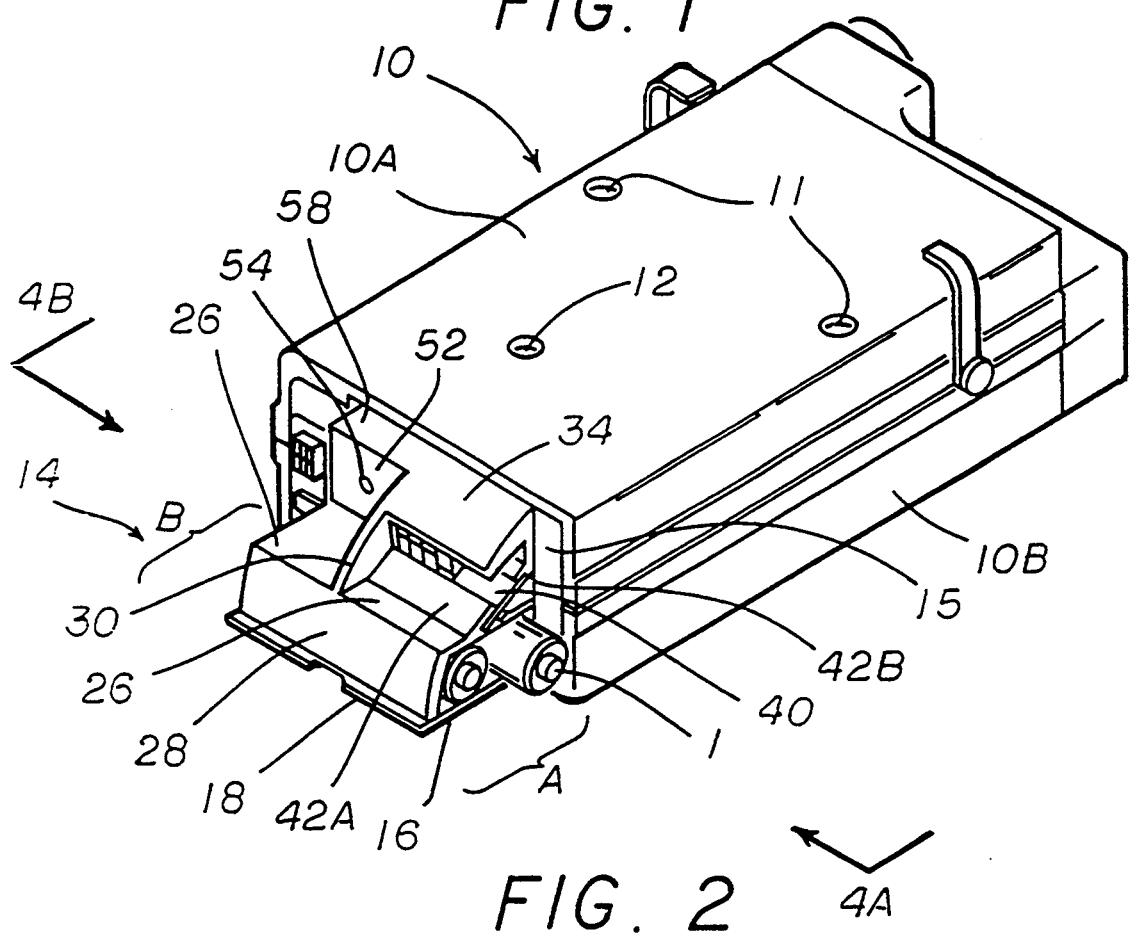
FIG. 2 is a perspective view of the battery compartment and door assembly of the instant invention in an open position in the housing of an electronic device.

Referring primarily to FIG. 2, the battery compartment 14 is shown in an open position in connection with a housing 10 having a top portion 10a and a lower portion 10b. In the housing 10 shown, top portion 10a is securely fastened to bottom portion 10b by screws 11. Top portion 10a includes a retaining screw access hole 12, the purpose of which will be described hereafter.

Throughout this description, the description of the battery compartment 14 will be in connection with the two part housing 10 described above. However, the particular form of housing 10 is merely exemplary; any type housing is amenable to use with the battery compartment 14 described herein, as will be obvious to those skilled in the art.

Figure 4A:
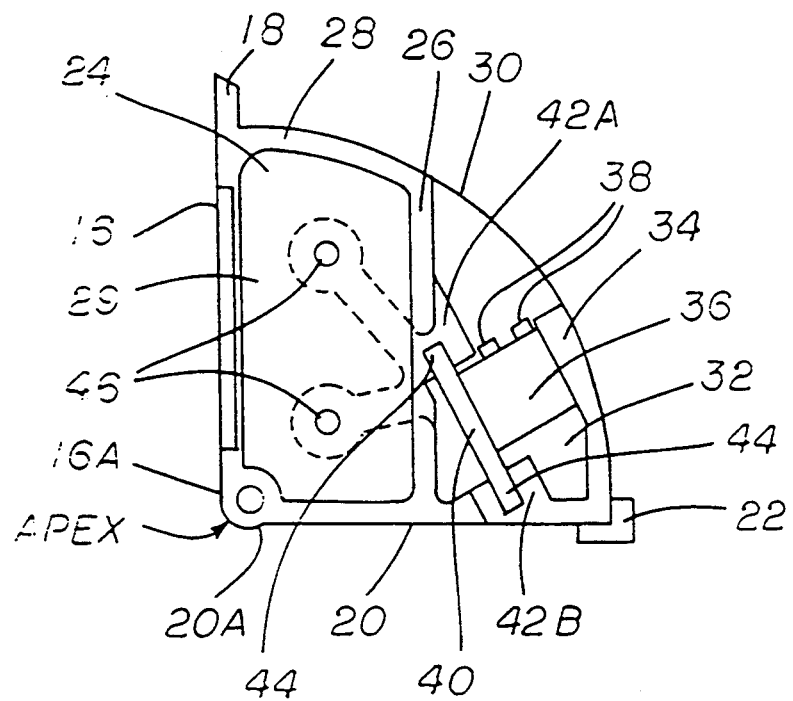
FIG. 4A is a side view of the battery compartment and door of the invention of FIG. 2 along the line labelled "4A" in FIG. 2.
Figure 4B:
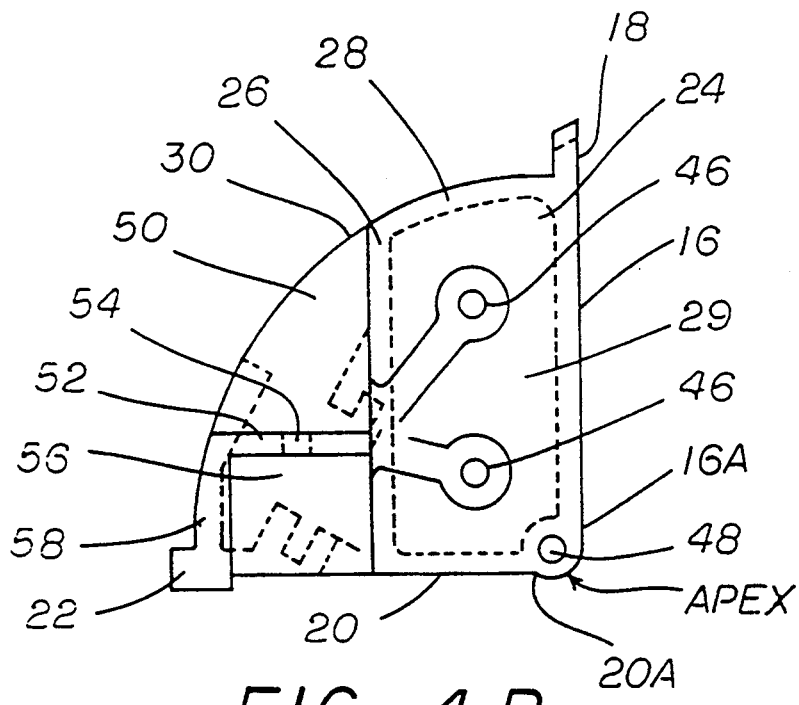
FIG. 4B is a side view of the battery compartment and door of the invention of FIG. 2 along the line labelled "4B" in FIG. 2.
Figure 5:
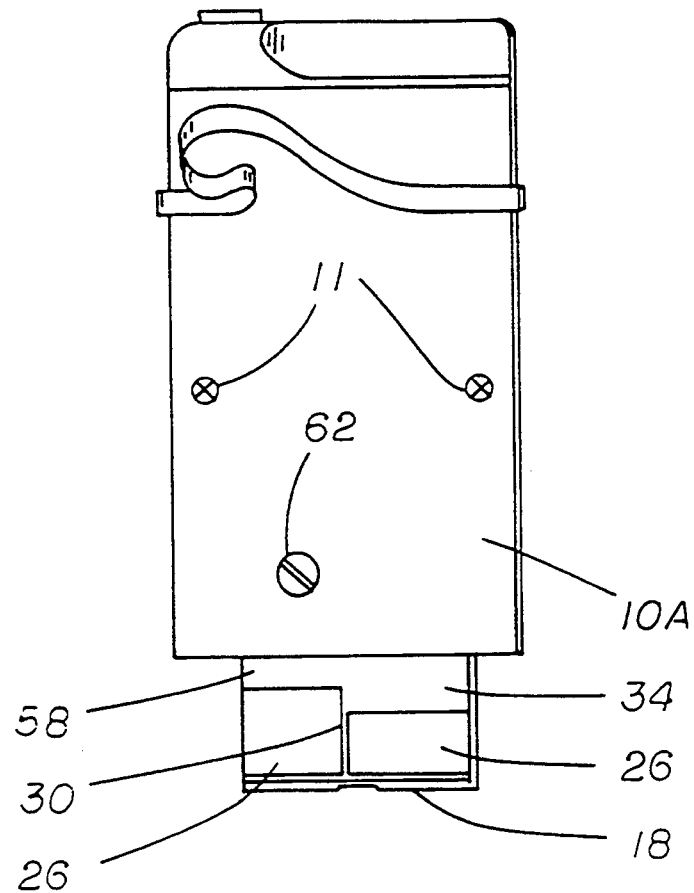
FIG. 5 is a top view of the battery compartment and door of the invention of FIG. 2 in an open position on a housing.
Figure 6:
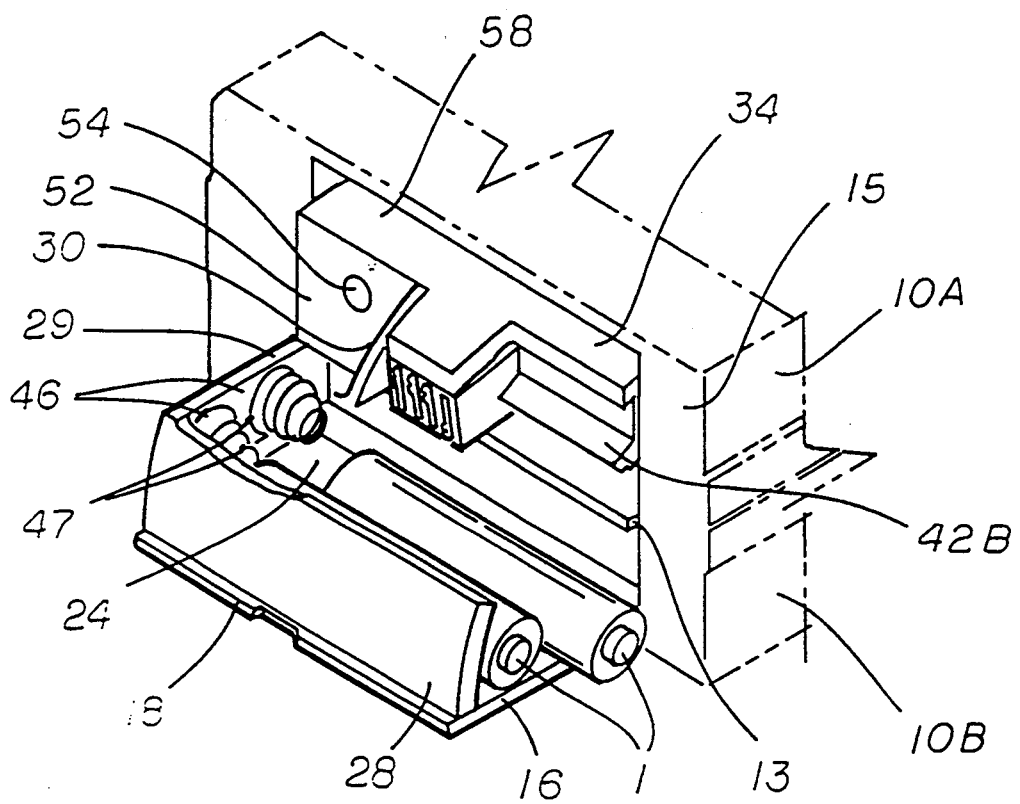
FIG. 6 is a perspective cut-away view through the battery compartment and door of the invention of FIG. 2.

A side view of the battery compartment along line 4A in FIG. 2 is shown in FIG. 4A and a side view of battery compartment 14 along line 4B in FIG. 2 is shown in FIG. 4B. In FIG. 4A, battery compartment 14 can be seen to include a door 16 extending radially away from a pivot 48 and ending in a lip 18. Door 16 extends entirely along the elongated length of battery compartment 14 and is approximately the same size and shape as an opening 13 in end wall 15 of housing 10 through which battery compartment 14 will pivot (FIG. 6). Door 16 has a door edge 16a at the apex (FIG. 4A, 4B) of battery compartment 14.

A radial wall 20 also extends from pivot 48 so that a 90° angle is formed between door 16 and radial wall 20. Radial wall 20 also extends generally along the elongated length of battery compartment 14 with exceptions that will be explained hereafter. Radial wall 20 has a wall edge 20a at the apex (FIG. 4A, 4B) of battery compartment 14. Radial wall 20 ends in a stop 22 as it moves away from pivot 48.

A battery chamber 24, to hold batteries 1, is formed between door 16 and opposed battery chamber side wall 26 and radial wall 20 and opposed battery chamber outer wall 28. Battery chamber 24 is open only on one end A as shown in FIG. 2 to allow batteries 1 to be placed into battery chamber 24. Battery chamber end wall 29, as best shown in FIG. 4B, closes the end of battery chamber 24 at closed end B opposite the open end A. As a result, battery chamber 24 encloses batteries 1 and is closed except for the open end A. As can be seen from the Figures, battery chamber outer wall 28 has a curved outer surface which is defined by being equidistant from pivot 48.

Negative polarity battery connectors 46 are positioned on battery chamber end wall 29 and extend into battery chamber 24. Springs 47 are attached to negative polarity battery connectors 46 to provide a bias on batteries 1 to contact positive polarity battery connectors 72 that will be described hereafter. The negative polarity terminals of batteries 1 may contact negative polarity battery connectors 46 itself or through springs 47. In the preferred embodiment, it is intended that a spring 47 (FIG. 6) be placed on negative polarity battery connector 46 to connect negative polarity battery connector 46 with the negative polarity end of battery 1 and to provide a slight bias on batteries 1 toward the open end A of battery chamber 24. Negative polarity wires 76 (FIG. 7) connect negative polarity battery connectors 46 to the electronic components stored within housing 10.

Although battery chamber 24 is shown in the illustrative embodiment as containing two batteries, battery chamber 24 may be formed according to the teachings of the invention and according to the desired kind and number of batteries, in any desirable shape within the wedge shaped space provided and to include any desired number of batteries.

A center ridge 30 is positioned between open end A and closed end B of battery chamber 24. Center ridge 30 is also defined by having an outer edge equidistant from pivot point 48. Center ridge 30 is a continuation of battery chamber outer wall 28 and extends from battery chamber 28 toward radial wall 20 (FIG. 2).

A switch compartment cover 34 extends away from radial wall 20 toward door 16. Switch compartment cover 34 is also defined by having an outer curved surface equidistant from pivot point 48 and extends away from center ridge 30 toward the open end A of battery chamber 24 (FIG. 2). A switch compartment 32 is defined between battery chamber side wall 26 and switch compartment cover 34 in the space between center ridge 30 and the open end A.

The battery compartment 14 is shown to represent an elongated geometrical shape generally defined as being sector-shaped which is bounded by two radii and the included arc of a circle represented by door 16, radial wall 20, and battery chamber outer wall 28, center ridge 30 and switch compartment cover 34, respectively. The importance of the battery compartment having such a sector shape will be further described hereafter in connection with the operation of the battery compartment 14.

In one embodiment of the invention, a switch box 36 containing at least one switch 38 is placed in switch compartment 32 by any suitable means and is electrically connected to the electronic components within housing 10. In addition, a circuit board 40, containing electronic components or connectors, which may be related to the operation of switch 36, may be placed in slots 44 in opposed circuit board positioning walls 42a and 42b. Circuit board positioning wall 42a is attached to battery chamber side wall 26 while circuit board positioning wall 42b is attached to radial wall 20.

Referring now to FIG. 4B, the battery chamber 24 is shown in phantom on the opposite side of battery chamber end wall 29. A retaining screw access chamber 50 is defined by the space between battery chamber side wall 26 and a retaining screw positioning plate 52 with center ridge 30 at one end and open at the closed end B of battery compartment 14. Retaining screw hole 54 extends through retaining screw positioning plate 52 to provide access to a support post chamber 56.

Support post chamber 56 is defined by battery chamber side wall 26 on one side and support post outer wall 58 on the opposing side. Retaining screw positioning plate 52 is perpendicular to battery chamber side wall 26 and connects battery chamber side wall 26 with support post outer wall 58. Center ridge 30 closes one end of support post chamber 56 while the opposed end of support post chamber 56, at closed end B of battery compartment 14, is open.

As stated above, radial wall 20 extends generally along the elongated length of battery compartment 14 with some exceptions. A primary exception is that the open side of support post chamber 56 opposite retaining screw positioning plate 52 extends through the otherwise continuous surface of radial wall 20.

Support post outer wall 58 also has a curved outer surface defined by being equidistant from pivot point 48. As stated above, support post outer wall 58, center ridge 30, battery chamber outer wall 28 and switch compartment cover 34 all have a curved outer surface defined by being equidistant from pivot point 48 for a purpose which will be described hereafter in connection with the operation of the battery compartment 14.

Figure 3:
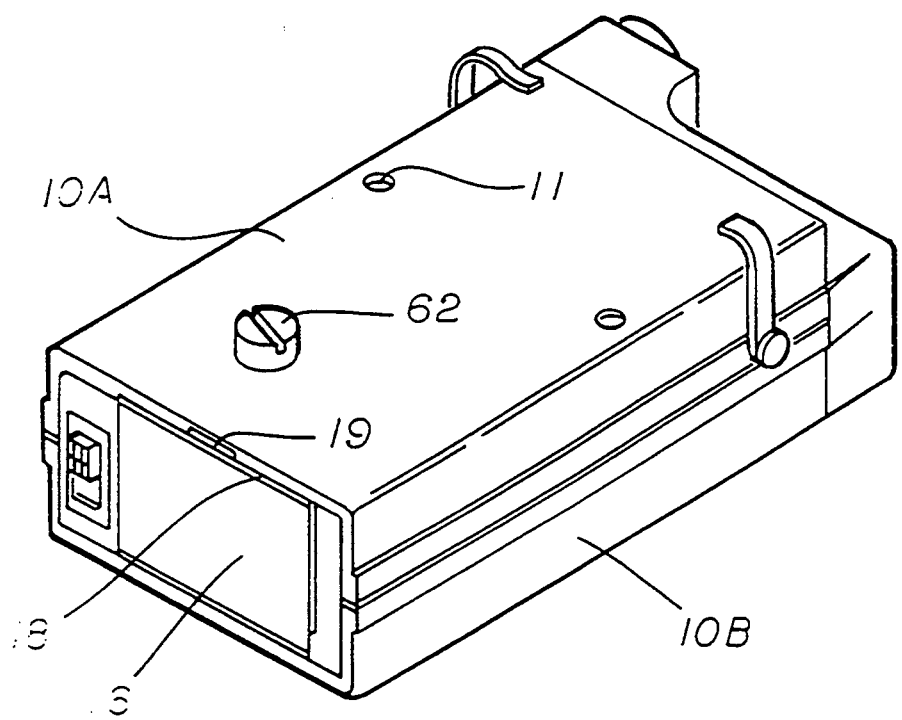
FIG. 3 is a perspective view of the invention of FIG. 2 in the closed position.

A support post 68 (FIG. 9) having a threaded inner slot 70, is attached to housing bottom 10b by any suitable means for providing a rigid connection. Support post 68 is positioned on housing bottom 10b so that when battery compartment 14 is in its closed position as shown in FIG. 3, threaded slot 70 is aligned with retaining screw hole 54. Support post 68 has a length so that the upper surface 68a of support post 68 comes in contact with retaining screw positioning plate 52 when battery compartment 14 is in its closed position. Also, retaining screw access hole 12 is positioned on housing top 10a so that its axis is aligned with threaded slot 70 of support post 68.

In use, battery compartment 14 is placed in housing 10 so that pivot 48 is aligned parallel and close to end wall 15 of housing 10. This allows battery compartment 14 to pivot around pivot 48 into and out of housing 10. Pivot 48 may be of any common form of pivoting including, but not limited to, protrusions extending from housing 10 into sockets on battery compartment 14, protrusions from battery compartment 14 extending into sockets in housing 10 or an axle extending along pivot 48 through battery compartment 14 that is attached at both ends to housing 10, to name but a few of the possible combinations. Pivot 48 is located within housing 10 so that when battery compartment 14 is in its closed position, as illustrated in FIG. 3, door 16 forms a closure for the opening 13 of end wall 15 to make a substantially planar surface across end wall 15 including door 16.

In this regard, lip 18 contacts end wall 15 opposite pivot 48 to prevent battery compartment 14 from rotating about pivot 48 into the inside of housing 10 past end wall 15. End wall 15 may include a recess along opening 13 of the contact point with lip 18 to allow battery compartment 14 to rotate slightly more into housing 10 than would be allowed without the recess. Contact between the recess and lip 18 allows door 16 to be planar with end wall 15. A notch 19 may be provided in lip 18 so that a thin blade such as a screwdriver may be inserted into notch 19 to pry door 16 away from end wall 15 in order to open the battery compartment 14. Alternately, a handle of any kind may be attached to door 16 to allow door 16 to be more easily opened.

When battery compartment 14 is in its open position, as shown in FIGS. 2 and 6, the curvature of the outer surfaces of battery chamber outer wall 28, center ridge 30, switch compartment cover 34 and support post outer wall 58 causes a very small opening between opening 13 and these outer surfaces. As a result, the stop 22, which extends away from pivot 48 further than these outer surfaces, comes in contact with the inner surface of end wall 15 at the outer edge of opening 13 to prevent further rotation of battery compartment 14 around pivot 48 beyond this contact position. When stop 22 contacts end wall 15, battery compartment 14 is in its most fully opened position.

In the embodiment shown, the relative angular position of door 16 and radial wall 20 in combination with lip 18 and stop 22 constrains the rotation of battery compartment 14 around pivot 48 to about a 90° angle. With the type of housing 10 shown in the figures, this allows battery compartment 14 to be contained within a housing having a height approximately equal to the height of door 16 from pivot 48 to lip 18. However, with other shaped or larger housings 10, the angle between door 16 and radial wall 20 may be increased.

For example, if end wall 15 is increased in size relative to door 16, the angle between door 16 and radial wall 20 may approach 180°. Further, if end wall 15, below opening 13, angles away from the plane of end wall 15 away from the inside of housing 10, angles between door 16 and radial wall 20 may approach 270°, depending on the angle of curvature of end wall 15. In this way, various dimensions of the compartments, for example the battery chamber 24 or the switch compartment 32, may be enlarged as desired to allow larger or more batteries, switches or other components.

Regardless of the angular configuration of door 16 and radial wall 20, the curved shape of the outer surfaces of battery chamber outer wall 28, center ridge 30, switch compartment cover 34, and support post outer wall 58 allows battery compartment 14 to rotate about pivot 48 and only contact end wall 15 at lip 18 or stop 22. Simultaneously, because of the curved shape of these outer surfaces, a relatively tight fit between the outer surfaces and end wall 15 is provided so that access is restricted to the interior of housing 10. Accordingly, the possibility of objects inadvertently entering housing 10 through the space between the outer surfaces and housing 10 is remote.

When it is desired to place batteries within the battery chamber 24, batteries 1 are placed in battery chamber 24 through the open end A of battery chamber 24 until the negative polarity posts of the battery 1 contact the springs 47 (if present) or the negative polarity battery connectors 46 at the closed end B of battery chamber 24. Battery chamber 24 is designed to have a length approximately equal to the length of the desired batteries 1.

To remove batteries 1 from the battery chamber 24, battery compartment 14 must be rotated to the open position shown in FIGS. 2 and 6. Thereafter, the batteries 1 may be removed from battery chamber 24 by grasping the end of the batteries with the fingers and removing. Alternately, or in addition, housing 10 may be tilted so that batteries 1 are pulled by the force of gravity from battery chamber 24 into, for example, the hand of the device's user.

When it is desired to close the battery compartment 14, battery compartment 14 is rotated around pivot 48 until lip 18 contacts the end wall 15 of housing 10. It may be necessary to push batteries 1 against the bias of spring 47 as battery compartment 14 is rotated in order to avoid contact between batteries 1 and the housing 10. However, because battery chamber 24 is approximately the same length as batteries 1, and because batteries 1 are inserted into battery chamber 24 at the open end A, the compression of springs 47 will be minimized compared to the compression required to insert batteries in the prior art device described above. As a result, the problems of stressing springs 47, described above, are avoided.

Figure 7:
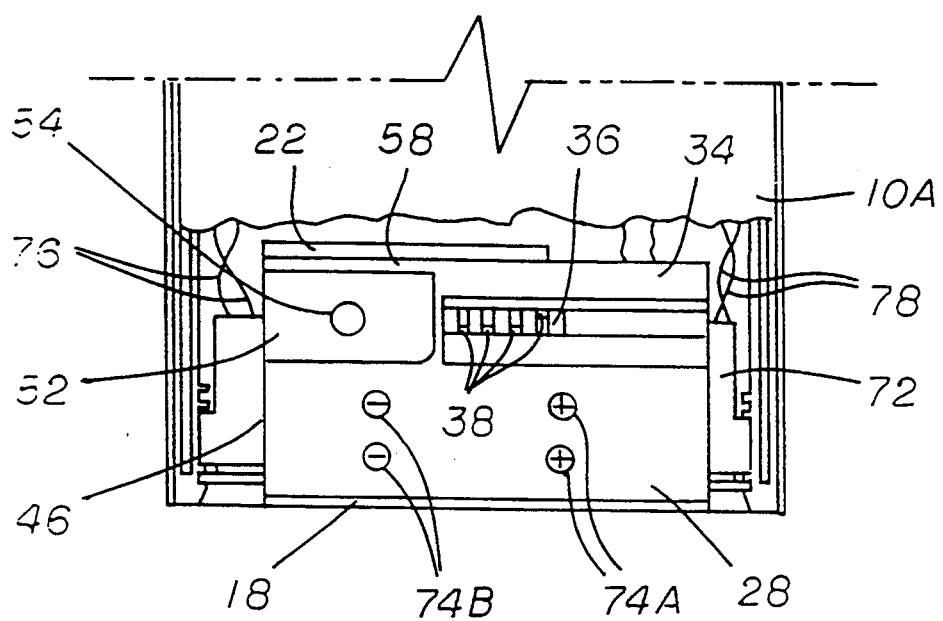
FIG. 7 is a top cutaway view of the battery compartment and door of FIG. 2 in the closed position within the housing.
Figure 8:
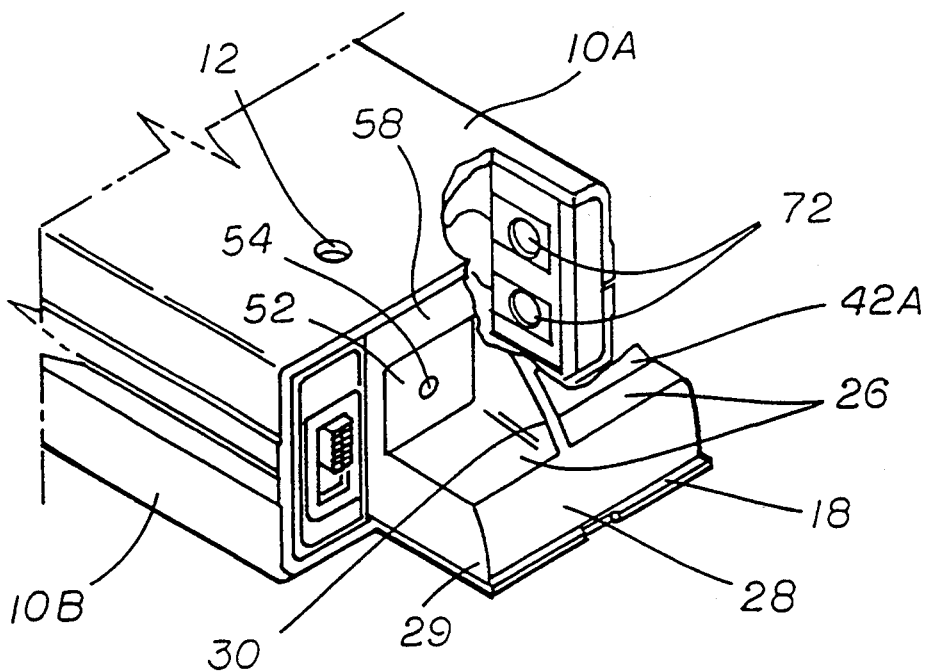
FIG. 8 is a perspective cutaway view, from the opposite side of the device from FIG. 2, of the battery compartment and door assembly of FIG. 2 in the open position showing the positive battery contact points on the housing; and, FIG. 9 is a perspective view of the retaining screw and support post of the instant invention.

As battery compartment 14 rotates around pivot 48, the positive polarity end of batteries 1 will move into contact with the positive polarity battery connector 72 located on the inside of housing 10 (FIGS. 7 and 8). Positive polarity battery connector 72 is located within housing 10 such that when battery compartment 14 is in its closed position as shown in FIG. 3, the positive polarity ends of batteries 1 will contact positive polarity battery connector 72 under the bias of springs 47. Positive polarity battery connector 72 will then provide an electrical connection to the electronic components contained within housing 10 from batteries 1 through positive wires 78. The bias provided by spring 47 pushes the batteries 1 against the positive polarity battery connector 72 at one end while providing a good connection with negative battery connector 46 at the other end of batteries 1.

When battery chamber 24 is in its open position as shown in FIGS. 2 and 6, switches 38 of switch box 36 are readily accessible to a user. Switches 38 may be related to various operating parameters of the device contained within housing 10. In the open position, the switches 38 may be set by the user as desired to produce the desired operating condition. When the battery compartment 14 is rotated into its closed position as shown in FIG. 3, access is no longer available to the switches 38 which, having been preset, may dictate operating conditions of the device.

Figure 9:
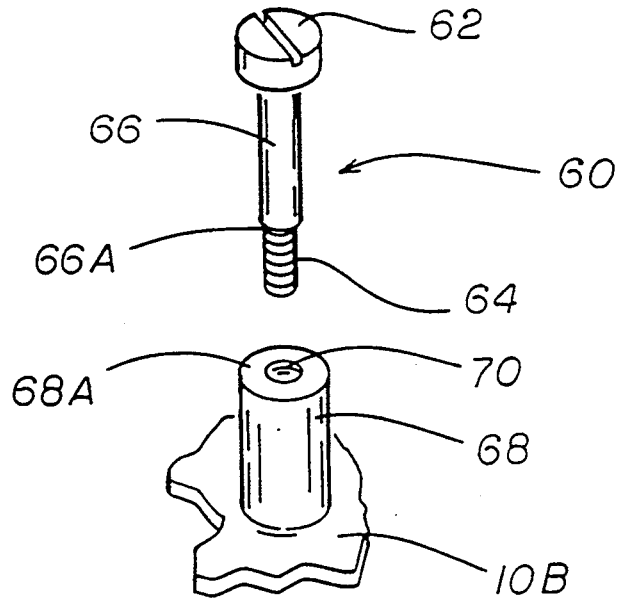

In order to secure battery compartment 14 in a closed condition, a retaining screw 60 is provided as shown in FIG. 9. Retaining screw 60 has a head 62 at one end to allow retaining screw 60 to be rotated about its longitudinal axis. Illustrative but not limiting examples of the shape of head 62 include slotted, knurled on the outer surface, or provided with a wrench or socket engageable surface such as a hexagon shape. Threads 64 are placed on retaining screw 60 opposite head 62. Threads 64 mesh with the threads of threaded slot 70 on support post 68. A cylindrical body 66 connects head 62 with threads 64. Retaining screw access hole 12 has a diameter approximately equal to the diameter of body 66.

When it is desired to securely close battery compartment 14 in the closed position as shown in FIG. 3, battery compartment 14 is first rotated around pivot 48 so that lip 18 comes in contact with end wall 15. Thereafter, retaining screw 60 is placed through retaining screw access hole 12 in housing top 10a so that threads 64 extend through retaining screw hole 54 and into contact with threaded slot 70. At this time, body 66 will extend through retaining screw access hole 12. Because retaining screw access hole has a diameter approximately equal to the diameter of cylindrical body 66, the longitudinal axis of retaining screw 60 is held in alignment with the longitudinal axis of both retaining screw access hole 12 and slot 70. Thereafter, retaining screw 60 is rotated about its longitudinal axis so that threads 64 will engage the threads in slot 70 and draw retaining screw 60 toward support post 68.

Retaining screw 60 is rotated until the end 66a of body 66 adjacent thread 64 comes into firm contact with retaining screw positioning plate 52 thereby causing retaining screw positioning plate 52 to be firmly held between support post 68 and end 66a of body 66. The length of body 66 is such that in this position, head 62 simultaneously comes into secure contact with the surface of housing top 10a. Other methods for bringing head 62 come into contact with housing top 10a may also be used such as providing a recessed channel to retain head 62.

When retaining screw 60 is in position as described above, battery compartment 14 is prevented from rotating about pivot 48 by the interaction of thread 64 and retaining screw hole 54. In this way, battery compartment 14 is held securely in place despite the movements of housing 10. In addition, should housing 10 receive a physical shock, the retention of battery compartment 14 by retaining screw 60 as described above prevents battery compartment 14 from opening and thereby allowing batteries 1 to escape from battery chamber 24. Because battery chamber 24 securely holds batteries 1 in position within battery chamber 24, and with the bias of spring 47 holding the batteries 1 in contact with both negative and positive polarity battery connectors 46,72, the batteries 1 are securely held within the battery chamber 24 despite any movement of the housing 10.

Although the batteries have been described as having a particular orientation as to the positive and negative polarity ends, it is clear that the direction of battery polarization may be reversed as desired. In order to clearly alert the user to the direction of battery polarization, battery polarity indicia 74 may be used (FIG. 7). In the drawing, positive polarity indicia 74a and negative polarity indicia 74b are used to indicate the desired orientation of the batteries.

As described above, the battery compartment 24 contains and encloses batteries 1 with the only open end being at the open end A. As a result, should batteries 1 leak, battery chamber 24 itself will contain the leaking battery material and prevent it from moving into contact with the inside of housing 10 where electronic components or other sensitive components may be located. Therefore, battery chamber 24 protects the interior from housing 10 from the consequences following from leaking batteries.

Because battery compartment 14 is attached to housing 10, it is virtually impossible to lose either the battery compartment 14 or the integrally attached door 16. During the loading or unloading of batteries, battery compartment 14 and door 16 are attached to housing 10 through pivot 48 so that the battery compartment 14 and door 16 could not be lost unless the entire housing 10 is lost. Further, as stated above, when battery compartment 14 is in its closed and locked position, with retention screw 60 in place in connection with support post 68, battery compartment 14 and door 16 are firmly locked in position so that even a great physical shock to the housing 10 or battery compartment 14 and door 16 will not cause battery compartment 14 and door 16 to be jarred loose from its connection to housing 10 through pivot 48 and retention screw 60.

As described above, switches 38 on switch box 36 may be set or reset as desired when battery compartment 14 is in its open position. As can be seen by reference to FIGS. 2 and 6, when battery compartment 14 is in its open position, batteries 1 are rotated out of contact with positive polarity battery connectors 72. As such, there is no continuous electric circuit to the components of housing 10 including batteries 1. As a result, when battery compartment 14 is rotated to its open position, electrical power to the components of housing 10 from batteries 1 is completely shut off.

The instant invention has been described in connection with particular embodiment. However, it is to be understood that the embodiment given herein, although considered the best mode of performing the invention, is merely exemplary and is not intended to be limiting. Changes and modifications may be made to the description contained herein and still be within the scope of the invention. Further, obvious changes and modifications will occur to those skilled in the art.

We claim:

1. In a housing comprising a housing end wall, a housing opening in the housing end wall, and an elongated substantially sector-shaped battery compartment having a planar door and a planar wall each extending outwardly from the apex of said battery compartment, and including means, located along the apex of said sector-shaped battery compartment, for pivoting the battery compartment into and out of the housing through the housing opening in the housing end wall, said means for pivoting the battery compartment pivoting the battery compartment along the apex of the sector-shaped battery compartment, the battery compartment pivoting from an open position to a closed position, the battery compartment further including means for electrically connecting batteries contained in the battery compartment with any desired components held within the housing, said sector-shaped battery compartment has a curved outer surface positioned equidistant from the apex and which terminates a distance from the apex slightly less than the distance from said means for pivoting and the boundary between the housing opening and the housing end wall to provide a close fit between the battery compartment and the housing to prevent foreign objects from inadvertently entering the housing, said door closing said housing opening when said battery compartment is pivoted into said housing;

whereby the battery compartment positions batteries, provides electrical connection between the batteries and desired components and provides access to the batteries.

2. The housing of claim 1 further comprising means for securing the battery compartment in the closed position.

3. The housing of claim 1 further comprising means for preventing said sector shaped battery compartment from pivoting entirely out of the housing.

4. The housing of claim 1 further comprising means for preventing said sector shaped battery compartment from pivoting entirely into the housing.

5. The housing of claim 1 further comprising at least one electrical switch for controlling various operating parameters of the components contained within the housing and being attached to said battery compartment and directed away from the apex of said battery compartment so that access may be had to said switch when said battery compartment is in its open position.

6. A battery compartment for a housing having a housing end wall and a housing opening in the housing end wall, the battery compartment positioning batteries and providing electrical connection between the batteries and desired components, the battery compartment providing access to the batteries, the battery compartment comprising:
   a) a substantially planar first wall having a first wall edge, said first wall terminating in a lip along said first wall farthest from said first wall edge, said lip extending from said first wall away from said first wall edge;
   b) a substantially planar second wall having a second wall edge wherein said second wall edge is connected to said first wall edge so that an angle is formed between said first wall and said second wall, said second wall terminating in a stop along said second wall farthest from said second wall edge, said stop extending from said second wall away from said second wall edge;
   c) means, located in the angle formed between said first wall and said second wall and attached to either one or both of said first or second walls, for positioning batteries comprising:
      i) a battery chamber side wall opposed to said first wall;
      ii) a battery chamber outer wall opposed to said second wall; and,
      iii) a battery chamber end wall attached at substantially a right angle to said first wall, said second wall, said battery chamber side wall and said battery chamber outer wall so that an enclosure for holding batteries is formed that is open only opposite said battery chamber end wall;
   d) means, connected to said means for positioning batteries, for electrically connecting the batteries to the desired components;
   e) means, located along the axis extending along both said first wall edge and said second wall edge, for pivoting the battery compartment into and out of the housing through the housing opening in the housing end wall, the battery compartment pivoting from an open position to a closed position;
   f) means for securing the battery compartment in the closed position including:
      i) a retaining screw positioning plate located substantially parallel to and away from said second wall in the space between said first wall and said second wall, said second wall being open opposite said retaining screw positioning plate to define a support post chamber extending into the battery compartment from said second wall, said retaining screw positioning wall having a retaining screw hole extending therethrough;
      ii) a support post attached to the housing and extending into said support post chamber when the battery compartment is pivoted by said means for pivoting into the housing into the closed position, said support post aligned with said retaining screw hole when the battery compartment is pivoted by said means for pivoting into the closed position, said support post having a threaded recess directed away from the housing, said support post contacting said retaining screw positioning plate when the battery compartment is pivoted by said means for pivoting into the closed position in the housing;
      iii) a retaining screw having a relatively narrow diameter threaded end and a relatively larger diameter body, said relatively narrow threaded end being selectively placeable through said retaining screw hole into threaded contact with said threaded recess in said support post, whereby rotating said retaining screw into contact with said threaded recess brings said body of said retaining screw into secure contact with said retaining screw plate which is in turn brought into secure contact with said support post;
   g) at least one electrical switch; and,
   h) means for attaching said switch to either said first wall or said second wall or both including a switch compartment cover extending away from said second wall forming a switch compartment between said switch compartment cover and said means for positioning batteries, said switch compartment cover having a curved outer surface defined by being equidistant from said means for pivoting;
   wherein said lip extends from said first wall away from said first wall edge a distance so that said lip contacts the housing end wall near the housing opening when the battery compartment is pivoted by said means for pivoting into the closed position whereby said first wall becomes a door to the housing opening;
   wherein said second wall terminates in a stop along said second wall farthest from said second wall edge, said stop extending from said second wall away from said second wall edge a distance so that said stop contacts the housing end from inside the housing when the battery compartment is pivoted by said means for pivoting into an open position whereby the battery compartment is prevented from pivoting entirely out of the housing by the contact of said stop with the housing end wall;
   wherein said battery chamber outer wall has a curved outer surface defined by being equidistant from said means for pivoting; and,
   wherein the housing includes a retaining screw access hole aligned with said threaded recess in said support post and wherein said retaining screw has a sufficient length to allow said retaining screw to be placed through the retaining screw access hole so that said threaded end of said retaining screw is placed into contact with said threaded recess in said support post.

7. A battery compartment in combination with a housing having a housing end wall and a housing opening in the housing end wall, the battery compartment positioning batteries and providing electrical connection between the batteries and desired components within the housing, the battery compartment providing access to the batteries, the battery compartment comprising:
   a) a first planar wall having a first wall edge and a perimeter generally conforming to the perimeter of said housing opening;
   b) a second planar wall having a second wall edge wherein said second wall edge is connected to said first wall edge so that an angle is formed between said first wall and said second wall;
   c) a curved outer wall extending between said first and second walls at a position distant from the angle formed between said walls, said curved outer wall being equidistant from the angle formed between said walls a first distance slightly less than a second distance from said angle formed between said walls and the boundary between the housing opening and the housing end wall farthest from said angle formed between said walls to provide a close fit between the battery compartment and the housing to prevent foreign objects from inadvertently entering the interior of the housing;
d) means, located in the angle formed between said first wall and said second wall and attached to either one or both of said first or second walls, for positioning batteries;
e) means for electrically connecting the batteries to the desired components; and,
f) means, located along the axis extending along both said first wall edge and said second wall edge, for pivoting the battery compartment into and out of the housing through the housing opening in the housing end wall, the battery compartment pivoting from an open position to a closed position.

8. The battery compartment of claim 7 wherein said first wall is substantially planar.

9. The battery compartment of claim 7 wherein said second wall is substantially planar.

10. The battery compartment of claim 7 wherein said means for electrically connecting the batteries is connected to said means for positioning batteries.

11. The battery compartment of claim 7 wherein said means for positioning batteries includes a battery chamber comprising:
a) a battery chamber side wall opposed to said first wall;
b) a battery chamber outer wall opposed to said second wall; and,
c) a battery chamber end wall attached at substantially a right angle to said first wall, said second wall, said battery chamber side wall and said battery chamber outer wall so that an enclosure for holding batteries is formed that is open only opposite said battery chamber end wall.

12. The battery compartment of claim 11 wherein said battery chamber outer wall has a curved outer surface defined by being equidistant from said means for pivoting.

13. The battery compartment of claim 7 further comprising means for securing the battery compartment in the closed position.

14. The battery compartment of claim 13 wherein said means for securing includes:
a) a retaining screw positioning plate located substantially parallel to and away from said second wall in the space between said first wall and said second wall, said second wall being open opposite said retaining screw positioning plate to define a support post chamber extending into the battery compartment from said second wall, said retaining screw positioning wall having a retaining screw hole extending therethrough;
b) a support post attached to the housing and extending into said support post chamber when the battery compartment is pivoted by said means for pivoting into the housing into the closed position, said support post aligned with said retaining screw hole when the battery compartment is pivoted by said means for pivoting into the closed position, said support post having a threaded recess directed away from the housing, said support post contacting said retaining screw positioning plate when the battery compartment is pivoted by said means for pivoting into the closed position in the housing;
c) a retaining screw having a relatively narrow diameter threaded end and a relatively larger diameter body, said relatively narrow threaded end being selectively placeable through said retaining screw hole into threaded contact with said threaded recess in said support post,
whereby rotating said retaining screw into contact with said threaded recess brings said body of said retaining screw into secure contact with said retaining screw plate which is in turn brought into secure contact with said support post.

15. The battery compartment of claim 14 wherein the housing includes a retaining screw access hole aligned with said threaded recess in said support post and wherein said retaining screw has a sufficient length to allow said retaining screw to be placed through the retaining screw access hole so that said threaded end of said retaining screw is placed into contact with said threaded recess in said support post.

16. The battery compartment of claim 7 wherein said first wall terminates in a lip along said first wall farthest from said first wall edge, said lip extending from said first wall away from said first wall edge a distance so that said lip contacts the housing end wall near the housing opening when the battery compartment is pivoted by said means for pivoting into a closed position whereby said first wall becomes a door to the housing opening.

17. The battery compartment of claim 7 wherein said second wall terminates in a stop along said second wall farthest from said second wall edge, said stop extending from said second wall away from said second wall edge a distance so that said stop contacts the housing end from inside the housing when the battery compartment is pivoted by said means for pivoting into an open position whereby the battery compartment is prevented from pivoting entirely out of the housing by the contact of said stop with the housing end wall.

18. The battery compartment of claim 7 further comprising:
a) at least one electrical switch for controlling various operating parameters of the device contained within the housing;
b) means for attaching said switch to either said first wall or said second wall or both.

19. The battery compartment of claim 18 wherein said means for attaching said switch includes a switch compartment cover extending away from said second wall forming a switch compartment between said switch compartment cover and said means for positioning batteries.

20. The battery compartment of claim 19 wherein said switch compartment cover has a curved outer surface defined by being equidistant from said means for pivoting.

21. The battery compartment in combination with a housing having a housing end wall and a housing opening in the housing end wall, the battery compartment positioning batteries and providing electrical connection between the batteries and desired components, the battery compartment providing access to the batteries, the battery compartment comprising:
a) a substantially planar first wall having a first wall edge, said first wall terminating in a lip along said first wall farthest from said first wall edge, said lip extending from said first wall away from said first wall edge;

b) a substantially planar second wall having a second wall edge wherein said second wall edge is connected to said first wall edge so that an angle is formed between said first wall and said second wall, said second wall terminating in a stop along said second wall farthest from said second wall edge, said stop extending from said second wall away from said second wall edge;

c) a curved outer wall substantially extending between said first wall and second wall defined by being equidistant from where said first and second walls are connected a first distance slightly less than the distance from where said first and second walls are connected and the boundary between the housing opening and the housing end wall to provide a close fit between the battery compartment and the housing to prevent foreign objects from inadvertently entering the housing;

d) means, located in the angle formed between said first wall and said second wall and attached to either one or both of said first or second walls, for positioning batteries comprising:
  i) a battery chamber side wall opposed to said first wall;
  ii) a battery chamber outer wall opposed to said second wall; and,
  iii) a battery chamber end wall attached at substantially a right angle to said first wall, said second wall, said battery chamber side wall and said battery chamber outer wall so that an enclosure for holding batteries is formed that is open only opposite said battery chamber end wall;

e) means, connected to said means for positioning batteries, for electrically connecting the batteries to the desired components;

f) means, located along the axis extending along both said first wall edge and said second wall edge, for pivoting the battery compartment into and out of the housing through the housing opening in the housing end wall, the battery compartment pivoting from an open position to a closed position; and, g) means for securing the battery compartment in the closed position;

wherein said lip extends from said first wall away from said first wall edge a distance so that said lip contacts the housing end wall near the housing opening when the battery compartment is pivoted by said means for pivoting into the closed position whereby said first wall becomes a door to the housing opening; and, wherein said second wall terminates in a stop along said second wall farthest from said second wall edge, said stop extending from said second wall away from said second wall edge a distance so that said stop contacts the housing end from inside the housing when the battery compartment is pivoted by said means for pivoting entirely out of the housing by the contact of said stop with the housing end wall.

* * * * *